United States Patent
Zheng et al.

(10) Patent No.: US 12,463,915 B2
(45) Date of Patent: Nov. 4, 2025

(54) METHOD AND APPARATUS FOR MANAGING A PACKET RECEIVED AT A SWITCH

(71) Applicant: HUAWEI TECHNOLOGIES CO., LTD., Shenzhen (CN)

(72) Inventors: Xiaolong Zheng, Toronto (CA); Xingjun Chu, North York (CA); Yashar Ganjali, North York (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 531 days.

(21) Appl. No.: 17/843,362

(22) Filed: Jun. 17, 2022

(65) Prior Publication Data
US 2023/0412518 A1    Dec. 21, 2023

(51) Int. Cl.
*H04L 47/32* (2022.01)
*H04L 45/74* (2022.01)
*H04L 47/30* (2022.01)

(52) U.S. Cl.
CPC .............. *H04L 47/32* (2013.01); *H04L 45/74* (2013.01); *H04L 47/30* (2013.01)

(58) Field of Classification Search
CPC ......... H04L 47/32; H04L 45/74; H04L 47/30; H04L 47/31
See application file for complete search history.

(56) References Cited

U.S. PATENT DOCUMENTS

| | | | | |
|---|---|---|---|---|
| 11,171,891 | B2* | 11/2021 | Srivastava | .......... H04L 49/9005 |
| 2003/0137940 | A1* | 7/2003 | Schwartz | ................ H04L 47/10 370/235 |
| 2007/0214302 | A1* | 9/2007 | Kubo | .................. G06F 12/0806 710/305 |
| 2014/0153574 | A1* | 6/2014 | Louzoun | ................. H04L 1/188 370/392 |
| 2020/0177513 | A1* | 6/2020 | Zhang | .................... H04L 49/358 |
| 2021/0021545 | A1 | 1/2021 | Srivastava et al. | |
| 2021/0376965 | A1* | 12/2021 | Liu | ..................... H04N 21/6473 |

FOREIGN PATENT DOCUMENTS

CN      112188557 A      1/2021

* cited by examiner

*Primary Examiner* — Chris Parry (57) ABSTRACT

A method and a network device are provided for transferring data packets to a port according to the priority of the packets and, when a packet is dropped, providing, to the sender of the packets, an early notification that the packet was dropped. The priority of a packet can be determined according to data contained in the packet, e.g., an operation code of the packet, or according to a marking of the packet by the sender, e.g., a marking resulting from a weighted random early detection template. The early notification that the packet was dropped is in the form of message generated at the network device and sent by the network device to the sender of the packet. The network device obtains, from the packet to be dropped or from a connection table, the information required for the message to arrive at the sender.

17 Claims, 10 Drawing Sheets

METHOD AND APPARATUS FOR MANAGING A PACKET RECEIVED AT A SWITCH

CROSS-REFERENCE TO RELATED APPLICATIONS

This is the first application filed for the present invention.

FIELD OF THE INVENTION

The present invention pertains to methods and systems for transferring data packets between network elements. In particular, the present invention pertains to transferring data packets based on data packet priority.

BACKGROUND

Data center networks (DCN) are fast evolving to meet the demanding requirements raised by high performance distributed systems, the requirements being related to, for example, distributed storage, high performance computing, distributed machine learning.

Remote direct memory access (RDMA) over converged Ethernet (RoCE) networks are increasingly present in high performance DCNs. Currently, RoCE networks require an environment where no packets are lost (a lossless environment). Due to RDMA network interface card's (NIC's) go-back-n retransmission mechanism, the NIC usually retransmits all the packets that were sent after the lost packet. Consequently, the effective throughput can degrade sharply when a packet is dropped.

To achieve a lossless environment, priority flow control (PFC) is needed. In operation, when a data queue builds up in a buffer at a port of a downstream switch, the downstream switch sends a pause frame to the upstream switch port that is sending the data. The pause frame causes the upstream switch port to pause and not send data downstream, thus preventing buffer overflow and packet drop at the strained port. However, in cases where the upstream switch port is providing data to more than just the strained port of the downstream switch, the flow of data to those other, perhaps unstrained ports, is also interrupted resulting in head-of-line blocking.

There are approaches that allow for loss of packets in RoCE networks and that thereby sacrifice network performance for network availability. Such lossy RoCE networks treat all packets the same in that any packet can be dropped, without regard to the importance a packet may have. Using this approach, if the last packet of a packet flow is lost, the sender would not perceive the packet loss until timeout, which can significantly affect the network application performance. This can occur frequently to small messages, especially with request messages or control messages.

Further, when packet loss occurs, the sender must wait one round trip time to receive the negative acknowledgement (NACK) from the receiver to determine that a packet was lost. The sender then identifies the lost packet and resends it to the receiver. In cases where there is congestion in the return path (the path from the receiver to the sender), the NACK might get further delayed, thus further delaying the flow completion.

Therefore, improvements in RoCE networks are desirable

This background information is provided to reveal information believed by the applicant to be of possible relevance to the present invention. No admission is necessarily intended, nor should be construed, that any of the preceding information constitutes prior art against the present invention.

SUMMARY

Embodiments of the present disclosure generally provide a method and apparatus for transferring data packets according to the priority of the packets and, when a packet is dropped, providing, to the sender of the packets, an early notification that the packet was dropped.

According to an embodiment of the present disclosure, there is provided a method performed at a network device. The network has that has an ingress port and an egress port that has a buffer. The network device holds a packet received at the ingress port, from a source. According to the method, the network device determines a level of occupancy of the buffer and determines a priority of the packet. The network device also determines if the priority of the packet and the level of occupancy meet a condition to drop the packet. When the condition to drop the packet is met, the network device drops the packet and sends to the source of the packet a message indicating the packet has been dropped.

In various examples of the preceding embodiment, the network device determines an address of the source of the packet and an address of the destination of the packet. The network further determines a sequence number of the packet. The network device also generates the message, which includes an address of the source of the message. The address of the source of the message is the destination address of the packet. The message also includes an address of the destination of the message. The address of the destination of the message is the source address of the packet. The message additionally includes the sequence number of the packet.

In various examples of the preceding embodiment, the network device determines a queue pair number (QPN) of the destination of the packet and accesses a connection table to obtain a QPN of the source of the packet in accordance with the address of the source of the packet, the address of the destination of the packet, and the QPN of the destination of the packet. The message further includes, as the QPN of the destination of message, the QPN of the source of the packet.

In various examples of the preceding embodiment, the network device receives a connection request packet and generates the connection table in accordance with the connection request packet.

In various examples of the preceding embodiment, determining the level of occupancy of the buffer includes comparing a queue length of the buffer to a threshold setting of the buffer.

In various examples of the preceding embodiment, when the queue length is greater than the threshold and when the priority of the packet satisfies a priority policy, the network device determines if an overflow condition is met at the buffer.

In various examples of the preceding embodiment, the drop condition is met when the overflow condition is met.

In various examples of the preceding embodiment, the packet is a received packet, and determining a priority of the received packet includes the network device reading an operation code (OpCode) of the received packet and comparing the OpCode to pre-determined OpCode values. The comparison obtains a relative priority of the received packet over other packets in a same packet flow as that of the received packet.

In various examples of the preceding embodiment OpCodes of SEND operations indicate a higher priority than OpCodes of READ operations.

In various examples of the preceding embodiment OpCodes of CONTROL operations indicate a higher priority than OpCodes of READ operations.

In various examples of the preceding embodiment determining a priority of the packet includes determining a value of a pre-determined field in a header of the packet.

In various examples of the preceding embodiment the packet is a marked packet in accordance with a weighted random early detection template, a marking of the marked packet includes a color. The network device determining the priority of the packet includes determining the color of the packet.

According to an embodiment of the present disclosure, there is provided a network device. The network device comprises an input port configured to receive a packet from a source. The network device also comprises an output port that has a buffer and a controller coupled to the input port and to the output port. The controller is configured to determine a level of occupancy of the buffer and determine a priority of the packet. The controller is also configured to determine if the priority of the packet and the level of occupancy meet a condition to drop the packet. The controller is further configured to, when the condition to drop the packet is met, drop the packet and send to the source a message indicating the packet has been dropped.

In various examples of some of the preceding embodiments, the controller is further configured to determine an address of the source of the packet, determine an address of a destination of the packet and determine a sequence number of the packet. The controller is also configured to generate the message, with the message including an address of the source of the message with the address of the source of the message being the destination address of the packet. The message further includes an address of the destination of the message and the sequence number of the packet. The address of the destination of the message is the source address of the packet.

In various examples of some of the preceding embodiments, the controller is further configured to determine a queue pair number (QPN) of the destination of the packet. The controller is also configured to access a connection table to obtain a QPN of the source of the packet in accordance with the address of the source of the packet, the address of the destination of the packet, and the QPN of the destination of the packet. The message includes, as the QPN of the destination of message, the QPN of the source of the packet.

In various examples of some of the preceding embodiments, the controller is further configured to receive a connection request packet and generate the connection table in accordance with the connection request packet.

In various examples of some of the preceding embodiments, the controller is further configured to determine the level of occupancy of the buffer by comparing a queue length of the buffer to a threshold setting of the buffer.

In various examples of some of the preceding embodiments, the network device further comprises a switch and the input port and the output port are part of the switch.

According to an embodiment of the present disclosure, a computer program product is provided. The computer program product comprises a non-transitory computer readable medium that has recorded thereon instructions to be carried out by a processor, at a network device coupled to the processor. The network device has an ingress port and an egress port. The egress port has a buffer. The network device holding a packet received at the ingress port, from a source. The instructions to be carried out by the processor comprise determining a level of occupancy of the buffer and determining a priority of the packet. The instructions also comprise determining if the priority of the packet and the level of occupancy meet a condition to drop the packet. The instructions further comprise, when the condition to drop the packet is met, dropping the packet and sending to the source a message indicating the packet has been dropped.

In various examples of some of the preceding embodiments, the instructions to be carried out by the processor further comprise determining an address of the source of the packet, determining an address of a destination of the packet, and determining a sequence number of the packet. The instructions additionally comprise generating the message, the message including an address of the source of the message, an address of a destination of the message, and the sequence number of the packet. The address of the source of packet is the destination address of the packet and the address of the destination of the message is the source address of the packet, and the sequence number of the packet.

In various examples of some of the preceding embodiments, the instructions to be carried out by the processor further comprise determining a queue pair number (QPN) of the destination of the packet and accessing a connection table to obtain a QPN of the source of the packet in accordance with the address of the source of the packet, the address of the destination of the packet, and the QPN of the destination of the packet. The message includes, as the QPN of the destination of message, the QPN of the source of the packet.

In various examples of some of the preceding embodiments, the instructions to be carried out by the processor further comprise receiving a connection request packet and generating the connection table in accordance with the connection request packet.

In various examples of some of the preceding embodiments determining the level of occupancy of the buffer includes comparing a queue length of the buffer to a threshold setting of the buffer.

In various examples of some of the preceding embodiments, the instructions to be carried out by the processor further comprise, when the queue length is greater than the threshold and when the priority of the packet satisfies a priority policy, determining if an overflow condition is met at the buffer.

In various examples of some of the preceding embodiments, the drop condition is met when the overflow condition is met.

In various examples of some of the preceding embodiments, the packet is a received packet and the instructions to be carried out by the processor further comprise determining a priority of the received packet includes and reading an operation code (OpCode) of the received packet. The instructions also comprise comparing the OpCode to pre-determined OpCode values to obtain a relative priority of the received packet over other packets in a same packet flow as that of the received packet.

In various examples of some of the preceding embodiments, OpCodes of SEND operations indicate a higher priority than OpCodes of READ operations.

In various examples of some of the preceding embodiments, OpCodes of CONTROL operations indicate a higher priority than OpCodes of READ operations.

In various examples of some of the preceding embodiments, determining a priority of the packet includes determining a value of a pre-determined field in a header of the packet.

In various examples of some of the preceding embodiments, the packet is a marked packet in accordance with a weighted random early detection template and a marking of the marked packet includes a color. The instructions further comprise determining a priority of the packet includes determining the color of the packet.

Embodiments of the present disclosure can classify packets in a high priority class or in a low priority class and prioritize the high priority packets over the low priority packets when facing severe traffic congestion. When packet loss happens, the network device at which the packet is dropped can generates a message identifying the dropped packet and immediately sends the message to the sender of the packet. This can reduce the feedback delay considerably.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The present disclosure provides methods and apparatuses for managing packets received at a switch or at any other type of network device that is configured to perform switching operations or that includes a switch (e.g., a router, a server, etc.) The switch may be part of, for example, a lossy RoCE network or a lossy TCP/IP network. The present disclosure, according to embodiments, allows for the determination of whether a packet received at a switch should be dropped, based on the pre-set priority of the packet. Packets with operation codes indicating a SEND command or a control command may be identified as having a high priority while packets with operation codes indication a WRITE commend may be identified as having a low priority. The present disclosure, according to embodiments, may also allow the sender of the packet to be notified of a dropped packet by the switch that has dropped the packet. This considerably reduces the notification time in comparison to the standard practice of having the intended receiver of the packet notify the sender.

As used herein, the term "about" should be read as including variation from the nominal value, for example, a +/−10% variation from the nominal value. It is to be understood that such a variation is always included in each value provided herein, whether or not it is specifically referred to.

Unless defined otherwise, all technical and scientific terms used herein have the same meaning as commonly understood by one of ordinary skill in the art to which this invention belongs.

Figure 1:
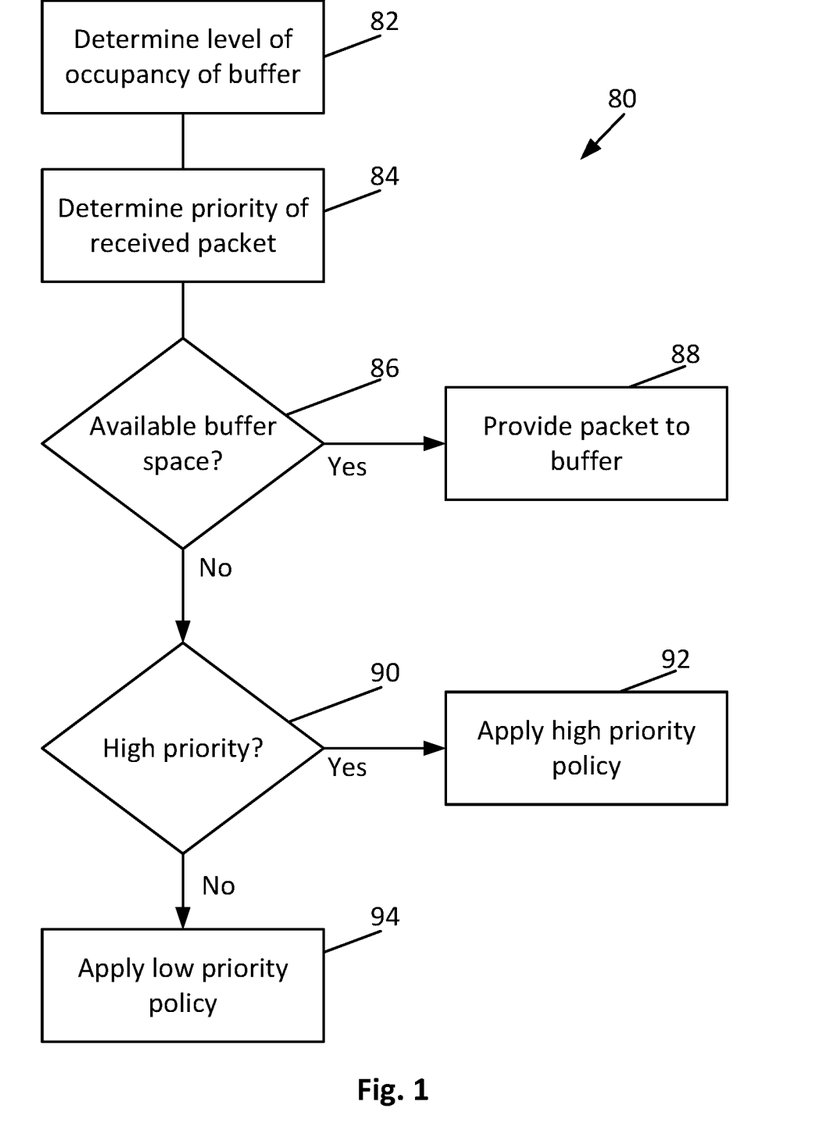
FIG. 1 shows a flowchart of a method of managing a packet received at a switch, in accordance with an embodiment of the present disclosure.

FIG. 1 shows a flowchart of a method 80 in accordance with an embodiment of the present disclosure. The method is for managing a packet received at a switch (a received packet) in accordance with a priority of the received packet and in accordance with available space at a buffer of an output port of the switch to which the received packet is to be provided. The output port may also be referred to as an egress port. The buffer may be partially occupied by previously received packets.

At action (or operation) 82, the switch may determine a level of occupancy of the buffer. For example, the switch may determine if there is unoccupied space in the buffer. The switch may also determine if the size of the received packet is the same of is less than the size of the unoccupied buffer space. As another example, the switch may determine a measure of occupied space of the buffer relative to the entire buffer space. As a further example, the switch may determine a level of occupancy of the buffer by determining the amount of occupied buffer space and comparing that amount to a pre-determined buffer parameter. For example, the switch may determine if the queue length in the buffer is greater than that threshold setting of the buffer.

At action 84, the switch may determine a priority of the received packet. The priority of the received packet may be set prior to the packet being received at the switch. For example, the priority may be set by the sender of the packet.

At action 86, the switch may determine, in accordance with the level of occupancy, if the packet may be provided to the output port (to the buffer of the output port). That is, action 86 may determine if there is available buffer space. For example, in some embodiments, when the size of the received packet is the same or less than the size of the unoccupied space in the buffer, then the method may proceed to action 88 and provide the received packet to the buffer of the output port. As another example, in some embodiments, when the queue length is not greater than the threshold of the buffer, then the method may provide, at action 88, the received packet to the buffer of the output port.

When the action 86 determines there is no available space in the buffer for the received packet, then the method may proceed to action 90, where it may be determined if the priority of the received packet is a high priority or a low priority. When the priority of the received packet is a high priority, then the method may proceed to action 92 where a high priority policy is applied to the received packet. Otherwise, when the priority of the received packet is a low priority, then the method may proceed to action 94 where a low priority policy is applied to the received packet.

Figure 2:
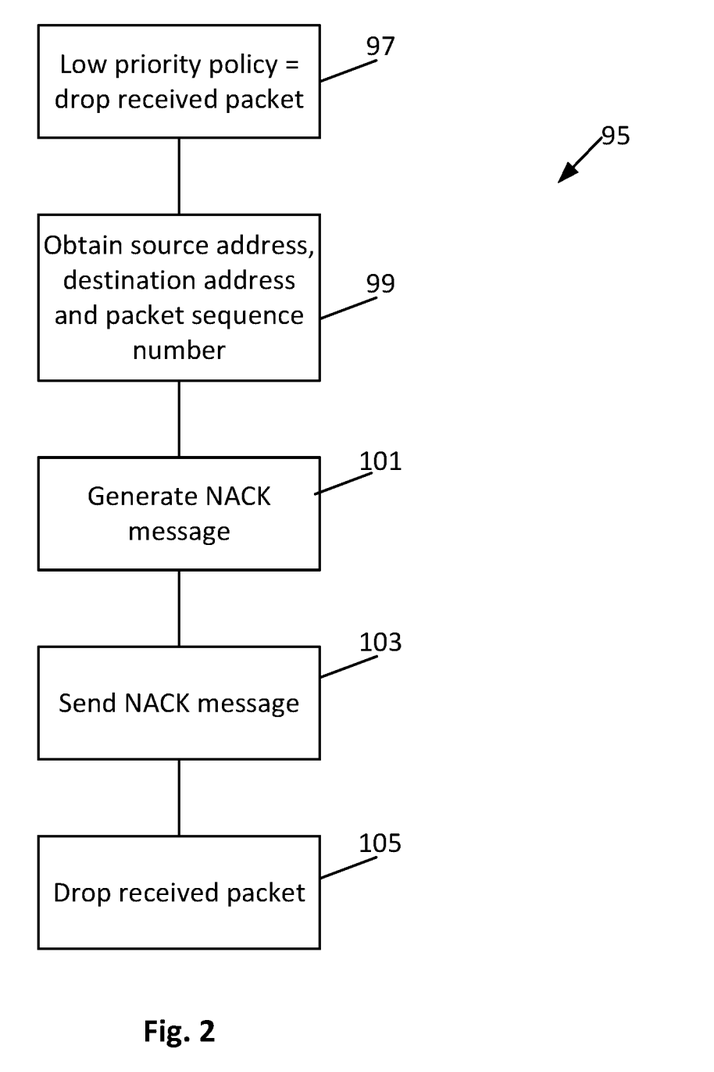
FIG. 2 shows a flowchart of a method of dropping a packet and notifying the sender of the dropped packet, in accordance with an embodiment of the present disclosure.

There may be several available options of what may constitute a high priority drop policy or a low priority drop policy. The example of FIG. 2 relates to a low priority drop policy. FIG. 2 shows a flowchart of a method 95 in accordance with an embodiment of the present disclosure. The method 95 shows an example of how a low priority policy may be applied to a received packet. At action 97, the low priority policy being applied to the received packet may be identified as being a drop packet policy, which means the received packet may be dropped. At action 99, the source address (sIP) of the packet, the destination address (dIP) of the packet and the packet sequence number (SN) may be obtained. At action 101, a negative acknowledgement (NACK) message may be generated and may be set to include, as the source address of the NACK message, dIP, and as the destination address of the NACK message, the sIP. The NACK message may also be set to include the packet SN. The NACK message may be sent at action 103 and the packet may me dropped at action 105.

Figure 3:
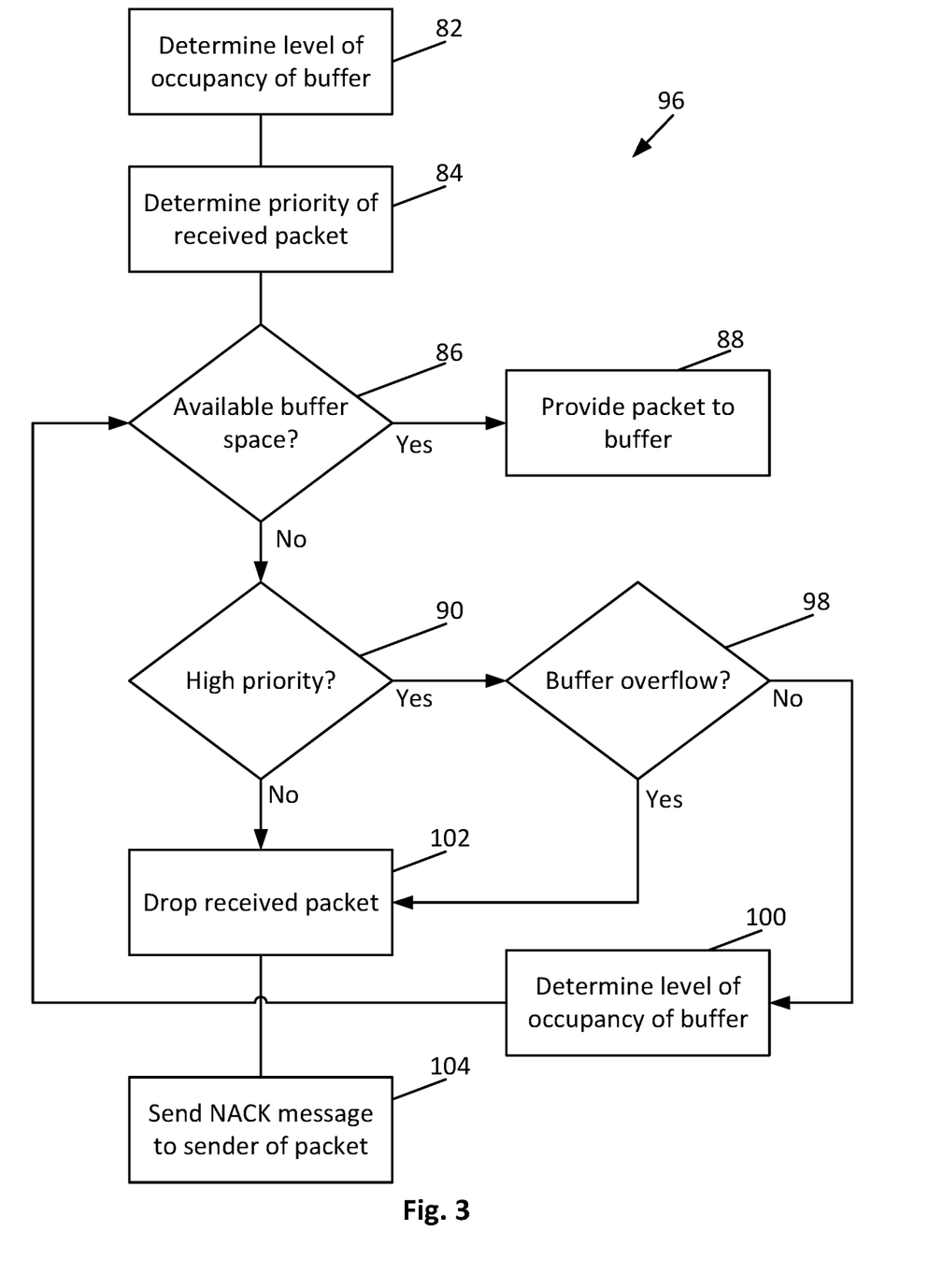
FIG. 3 shows a flowchart of a method of managing a packet received at a switch, in accordance with another embodiment of the present disclosure.

FIG. 3 shows a flowchart of a method 96 in accordance with an embodiment of the present disclosure. The method 96 includes the same actions as those of the method 80 of FIG. 1. However, FIG. 3 shows an example of what the action 92 of the method 80 (apply high priority policy) may include and of what the action 94 of the method 80 (apply low priority policy) may include.

As shown in FIG. 3, when the action 90 determines the received packet has a high priority, the method may proceed to action 98, where the switch may determine if the buffer is overflowing. When the buffer is not overflowing, the method may proceed to action 100, where the switch may determine the level of occupancy of the buffer and from there, proceed back to action 86 where the switch may determine, in accordance with the level of occupancy if the received packet may be provided to the output port (to the buffer of the output port). If the action 88 determines the buffer is overflowing, then the method may proceed to drop the packet at action 102.

The method 96 increases the likelihood that a high priority packet for which there is initially no available buffer space may eventually be provided to the buffer when buffer space becomes available. In method 96, a received packet with a high priority may be dropped only when the buffer overflows, at which point the method 96 proceeds from action 98 to action 102.

In FIG. 3, when the action 90 determines the received packet has a low priority, the method may proceed to action 102, which drops the packet, and to action 104 where the switch provides a NACK message to the source of the received packet, indicating the received packet has been dropped. Actions 102 and 104 may be interpreted as being part of applying a low priority policy to the received packet. Other high priority policies may include, as non limiting examples, not dropping the received packet until the buffer overflows; applying a random early detection drop with a high threshold; or applying a loopback. Another low priority policy may include, as a non limiting example, applying a random early detection drop with a low threshold.

Figure 4:
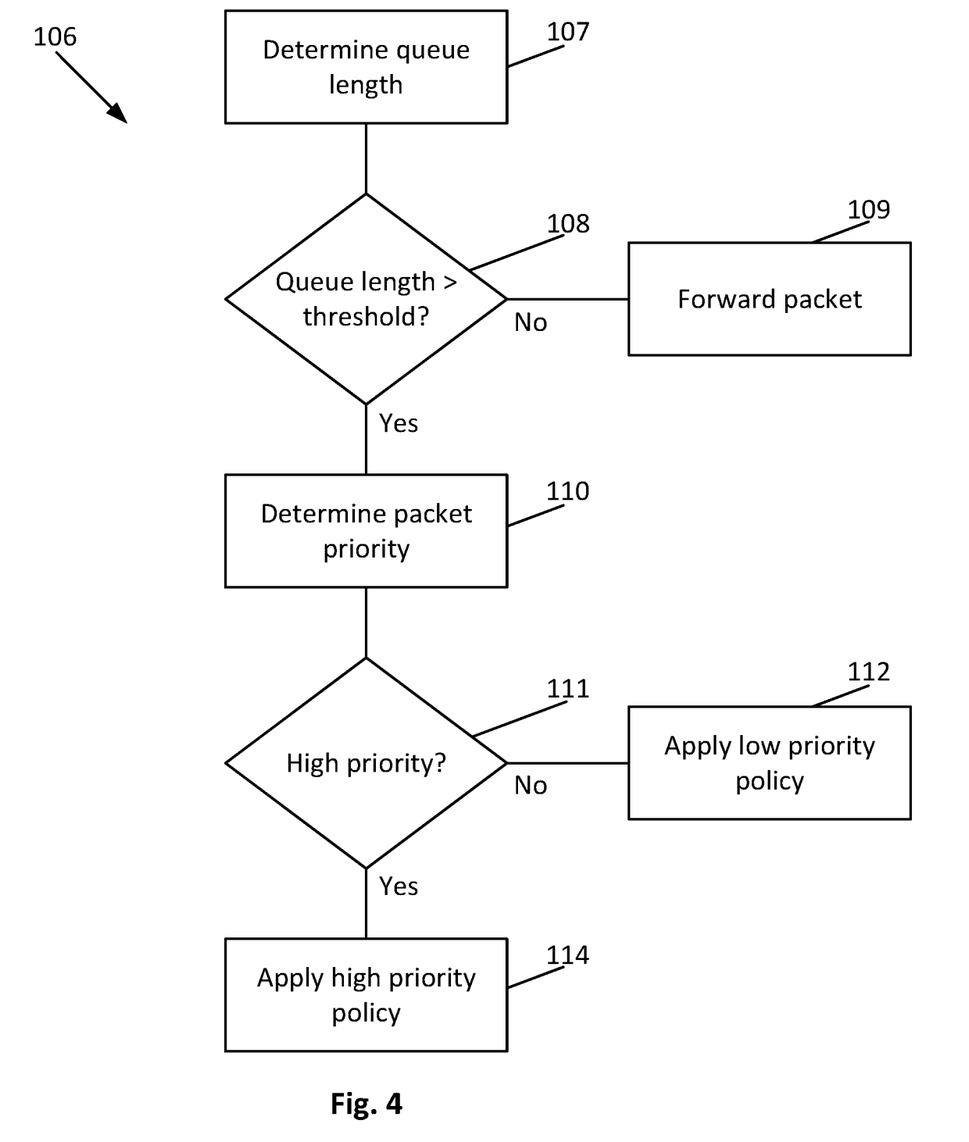
FIG. 4 shows a flowchart of a method of managing a packet received at a switch, in accordance with yet another embodiment of the present disclosure.

FIG. 4 shows a flowchart of a method 106 in accordance with an embodiment of the present disclosure. The method is for managing a packet received at a switch (a received packet) in accordance with a priority of the received packet and in accordance with available space at a buffer of an output port of the switch to which the received packet is to be provided. At action 107, to determine the level of occupancy of the buffer, the switch may begin by determining a length of the queue at the output port. At 108, the switch may determine if the queue length is greater than the threshold setting of the output port. If the queue length is not greater than the threshold, then, the method may proceed to action 109, where the received packet may be provided (forwarded) to the output port (to the buffer of the output port). Otherwise, if the queue length is greater than the threshold, then the method may proceed to action 110 where the switch may determine what is the priority setting of the received packet. The method may then proceed to action 111, where a determination of the priority is made. If the priority of the received packet is low, then the method may proceed to action 112 where a low priority policy is applied to the packet. Otherwise, if the priority of the received packet is high, the method may proceed to action 114 where a high priority policy is applied to the packet.

Figure 5:
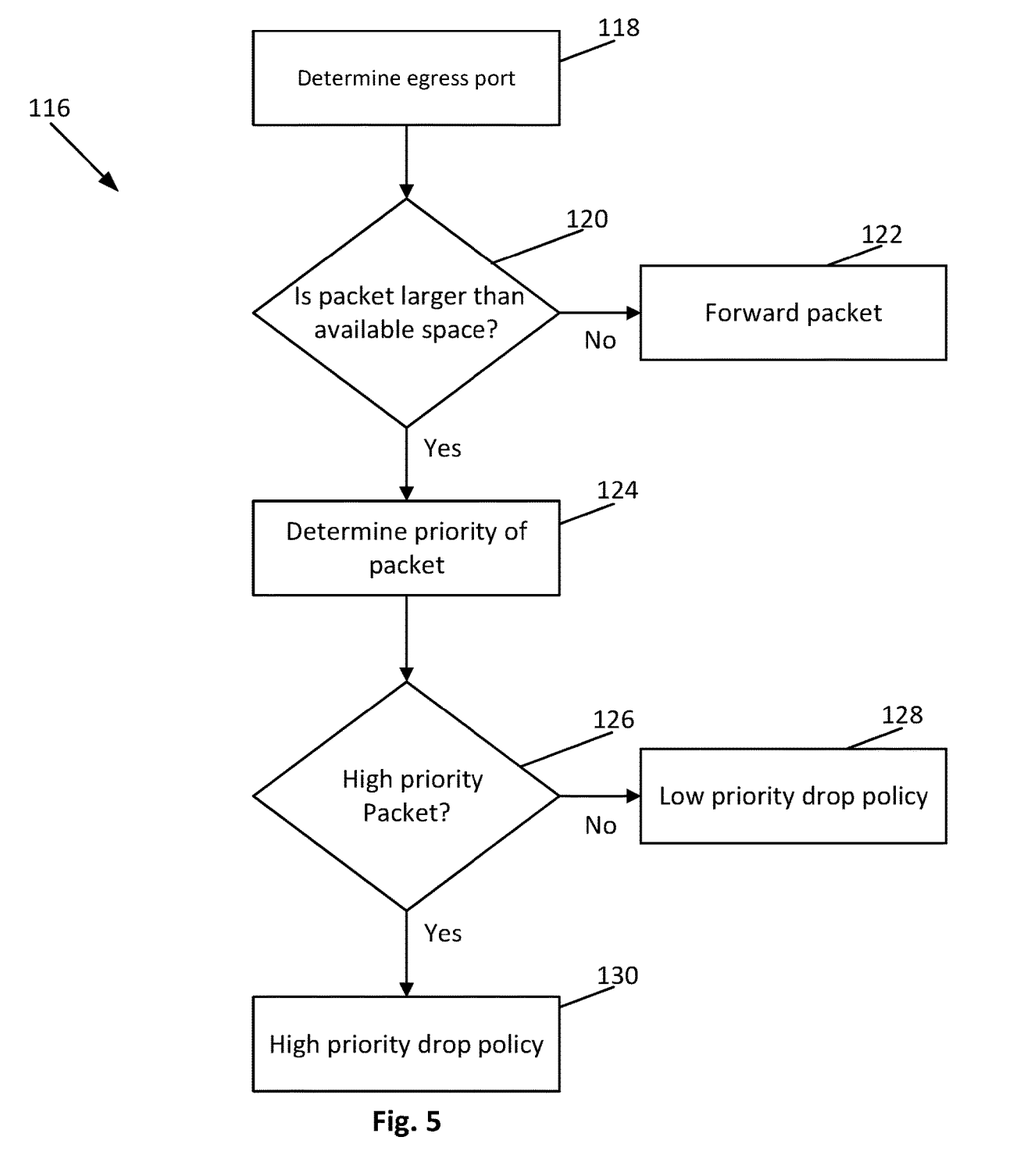
FIG. 5 shows a flowchart of a method of managing a packet received at a switch, in accordance with a further embodiment of the present disclosure.

FIG. 5 shows a flowchart of a method 116 in accordance with an embodiment of the present disclosure. The method is for managing a packet received at a switch (a received packet) that is to be provided to an egress port of a switch. The egress port may also be referred to as an output port. The egress port of the switch may have a buffer (memory buffer). The buffer may contain buffered packets that occupy a portion of the buffer or all the buffer.

At action 118, the switch may determine the egress port to which the received packet is to be forwarded. At action 120, the switch may determine if the size of the received packet is larger than the space available at the buffer of the egress port. If the size of the received packet is not larger than the buffer space available at the buffer of the egress port, then the method may proceed to action 122, where the switch may forward the received packet to the egress port.

If the size of the received packet is larger than the buffer space available at the buffer of the egress port, then the method may proceed to action 124, where the switch may determine a priority of the received packet. The method may then proceed to action 126 where the method may determine if the priority of the received packet is a high priority. If the priority of the received packet is not a high priority, then the method may proceed to action 128 where a low priority policy is applied to the packet. Otherwise, if the priority of the received packet is high, the method may proceed to action 130 where a high priority policy is applied to the packet.

In accordance with embodiments of the present disclosure, the priority of the received packet may be included in the received packet itself. In some embodiments, the priority of the received packet may be identified in the header of the received packet or may be identified elsewhere in the received packet. In some embodiments, the priority of the received packet may be attributed to specific data in the packet header such as, for example, data indicating an operation code (OpCode or opcode) of the received packet. As an example, for ROCE packets, the InfiniBand header of packets may include such an opcode.

Figure 6:
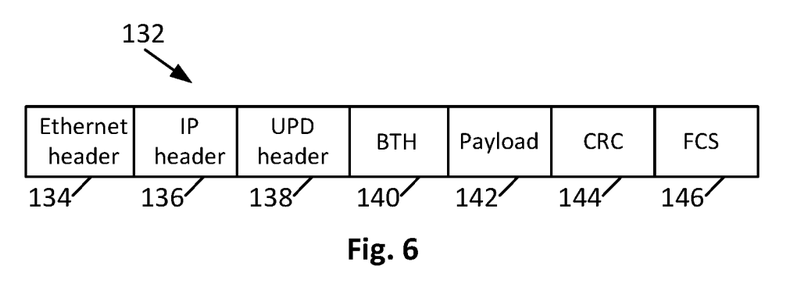
FIG. 6 shows an example of an RoCE packet.

FIG. 6 shows an example of an RoCE packet 132, which may include an Ethernet header 134, an Internet Protocol (IP) header 136, a user datagram protocol (UDP) header 138, a base transport header (BTH) 140, a payload 142, a cyclic redundancy check (CRC) field 144 and a frame check sequence (FCS) field 146. In some embodiments, the BTH 140 may be partitioned as shown in Table 1.

TABLE 1

|  | 31-24 bits | 23-16 bits | 15-8 bits | 7-0 bits |
|---|---|---|---|---|
| 0-3 Bytes | OpCode | | Partition Key | |
| 4-7 Bytes | | Destination QP | | |
| 8-11 Bytes | reserved | | Packet Sequence Number | |

Where "Destination QP" is the packet's destination queue pair.

In some embodiments, values of the OpCode may be as shown in the example of Table 2. Table 2 also shows possible priorities for the OpCodes, where SEND commands (OpCode has a binary value comprised between 00000 and 00101) and control commands (OpCode has a binary value comprised between 10001 and 10111) are attributed a high priority setting and READ and WRITE commands (OpCode has a binary value comprised between 00110 and 10000) are attributed a low priority setting. In the present embodiment, OpCode values not comprised in the aforementioned ranges may be attributed a high priority or a low priority.

TABLE 2

| Priority | OpCode[4-0] | Description |
|---|---|---|
| high | 00000 | SEND First |
| | 00001 | SEND Middle |
| | 00010 | SEND Last |
| | 00011 | SEND Last with Immediate |
| | 00100 | SEND Only |
| | 00101 | SEND Only with Immediate |
| low | 00110 | RDMA WRITE First |
| | 00111 | RDMA WRITE Middle |
| | 01000 | RDMA WRITE Last |
| | 01001 | RDMA WRITE Last with Immediate |
| | 01010 | RDMA WRITE Only |
| | 01011 | RDMA WRITE Only with Immediate |
| | 01100 | RDMA READ Request |
| | 01101 | RDMA READ response First |
| | 01110 | RDMA READ response Middle |
| | 01111 | RDMA READ response Last |
| | 10000 | RDMA READ response Only |
| high | 10001 | Acknowledge |
| | 10010 | ATOMIC Acknowledge |
| | 10011 | CmpSwap |
| | 10100 | FetchAdd |
| | 10101 | Reserved |
| | 10110 | SEND Last with Invalidate |
| | 10111 | SEND Only with Invalidate |
| | others | Reserved |

Figure 7:
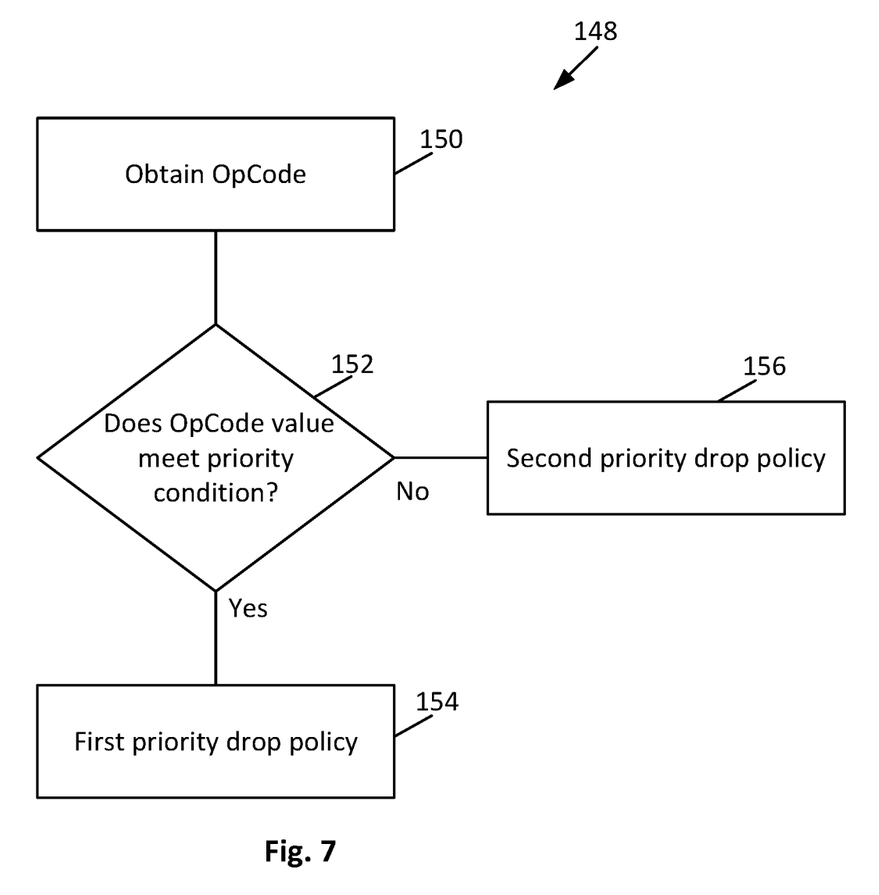
FIG. 7 shows a flowchart of a method of determining a priority of a packet, in accordance with an embodiment of the present disclosure.

FIG. 7 shows a flowchart of a method 148 of determining a priority of a packet in accordance with an embodiment of the present disclosure. At action 150, the OpCode of the received packet may be obtained. At 152, a determination may be made of whether the obtained OpCode value meets a priority condition. If the obtained OpCode value meets the priority condition, then the method may proceed to 154 where a first priority drop policy is applied to the received packet. If the obtained OpCode value does not meet the priority condition, the method may proceed to action 156 where a second priority drop policy may be applied to the received packet.

As an example, action 152 may compare the received packet OpCode value to pre-determined OpCode high priority values. If the action 152 determines that the received packet OpCode value matches one of the pre-determined OpCode high priority values, then the method may proceed to 154, where a high priority drop policy may be applied to the received packet. Accordingly, in the present example, a determination of the priority of the received packet may be obtained.

An alternate implementation of identifying the received packet's priority may include marking the packet at a pre-determined bit of the packet, prior to the packet being received at the switch where a priority policy is to be assigned. As an example, the pre-determined bit may be the last bit of the reserved field shown in table 2 as 0000001 when the packet is important. Such an implementation may require the host and a network interface to include the last bit of the reserved field in accordance with specific criteria set at the host.

With the mark at the last bit, the switch can merely read the reserved field and identify the packet as high priority when the value is 0000001, otherwise low priority.

Another implementation of the present disclosure may include a priority-based packet drop policy based on a weighted random early detection (WRED) template. In the WRED implementation, the switch may determine the priority of the received packet and color the packet in accordance with the priority. As an example, the switch may color the packet green if the packet has a high priority; otherwise, the switch may color the packet red. The WRED detection template applied to a green packet is of large marking threshold and low marking probability. The WRED template applied to red packet is of small marking threshold and 100% marking probability.

As is known in the art, with a WRED template, one may set the parameters for processing packets of three colors, that is, red, yellow, and green. Generally, green packets have the smallest discarding probability and the highest thresholds (both lower and higher); yellow packets have the medium discarding probability and thresholds; the red packets have the highest discarding probability and the lowest thresholds.

By configuring a WRED template, one can set the upper threshold, lower threshold, and discarding probability for queues. When the length of a queue is below the lower percentage threshold, no packet is dropped. When the length of a queue is between the lower and upper percentage thresholds, incoming packets are dropped randomly. The longer the queue, the higher the discarding probability. When the length of a queue exceeds the upper percentage threshold, all the incoming packets are dropped. One can configure limits and discarding probability for packets of every color.

According to embodiments of the present disclosure, when a switch determines that a packet is to be dropped, the switch may generate a negative acknowledgment (NACK) message and may send the NACK message to the sender of the packet. This may allow the sender of the packet to be notified of the dropped packet earlier than when the intended receiver of the packet determines the packet has been dropped and subsequently generates and sends a NACK message to the sender of the dropped packet.

Figure 8:
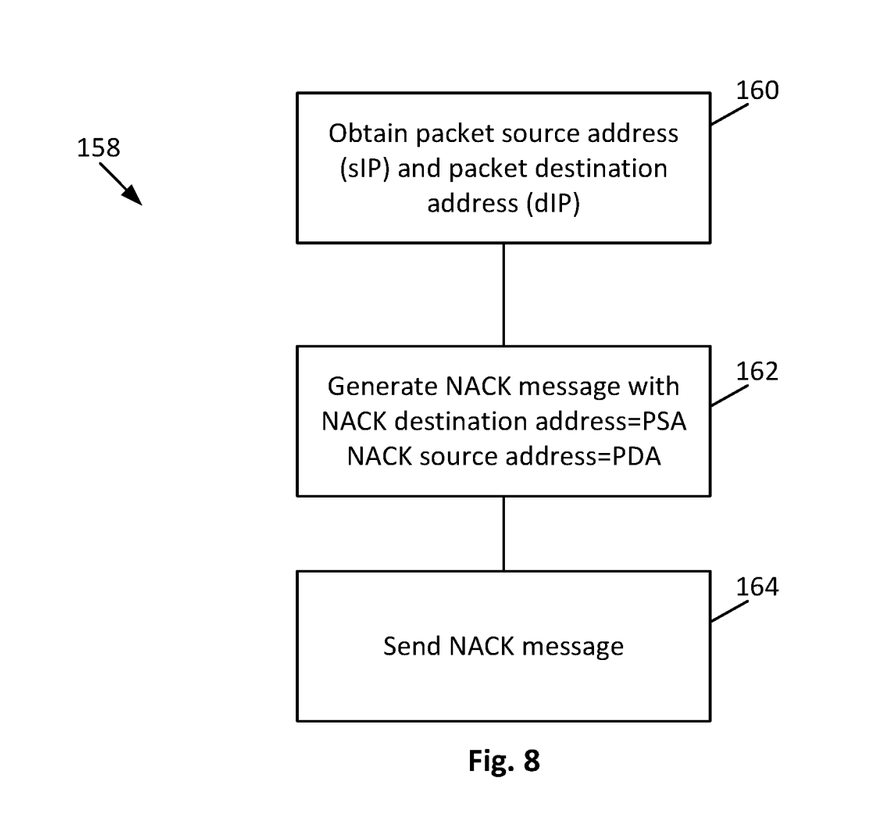
FIG. 8 shows a flowchart of a method of notifying a sender of a packet that the packet has been dropped, in accordance with an embodiment of the present disclosure.

FIG. 8 shows a flowchart of a method 158 in accordance with the present disclosure. The method 158 is for notifying a sender of a packet that the packet has been dropped. At action 160, the switch at which the received packet is being dropped may obtain, from the received packet, the source address (sIP) of the received packet. The switch may also obtain, from the received packet, the destination address (dIP) of the received packet. The switch may also obtain from the received packet the sequence number (SN) of the received packet. At action 162, the switch may generate a NACK message that may have a source address set to dIP, a destination address set to sIP, and the received packet SN. At 164, the NACK message may be sent, from the switch, to the source of the dropped packet.

In certain scenarios, the NACK message may need to include additional information to arrive at the source of the received packet. When the received packet includes the source address, the destination address and the destination queue pair number (dQPN), the NACK message may swap the destination address and the source address. However, obtaining the source queue pair number (sQPN) may not be as straightforward and may require accessing a connection table to do so.

Figure 9:
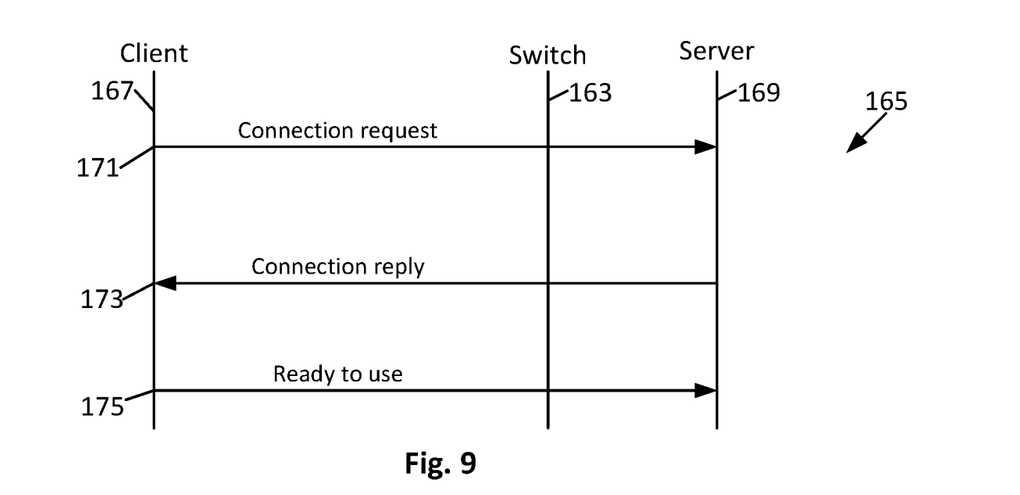
FIG. 9 shows a data flow chart in accordance with an embodiment of the present disclosure.

FIG. 9 shows an example of a data flow chart 165 where data may be exchanged between a client 167 and a server 169, through a switch 163 when setting up a connection between the client 167 and the server 169. The exchanged data may be used to populate a connection table generated at the switch 163. At action 171, the client 167 may send a connection request to the server 169. The connection request may include the source address (sIP), the destination address (dIP) and the source QPN (sQPN), which will be the dQPN used by the server 169 when sending packets to the client 167. At 173, the client 167 receive from the server 169, the source address of the server 169, the destination address used by server, and the QPN of server, which is the sQPN. The client 167 may send a ready-to-use message to the server 169, at action 175.

Figure 10:
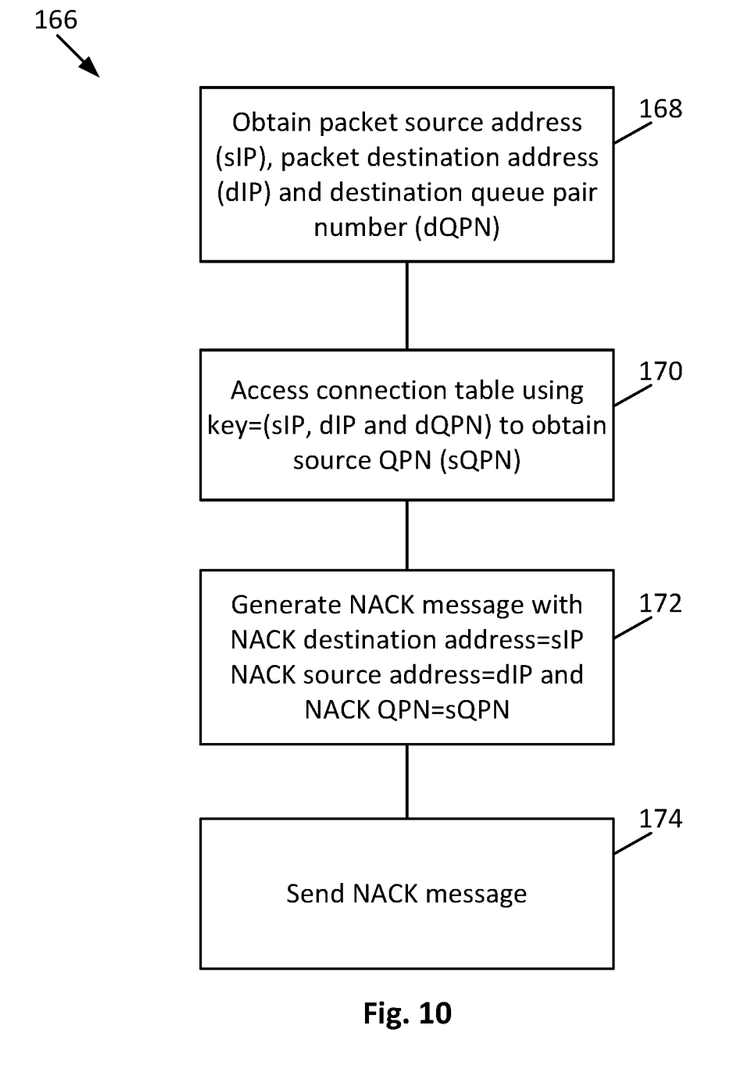
FIG. 10 shows a flowchart of a method of notifying a sender of a packet that the packet has been dropped, in accordance with another embodiment of the present disclosure.

FIG. 10 shows a flowchart of a method 166 in accordance with an embodiment of the present disclosure. The method 166 is for notifying a sender of a packet that the packet has been dropped. At action 168, the packet sIP, packet dIP and the dQPN may be obtained. At 170, a connection table may be accessed using the sIP, dIP and the dQPN to obtain the sQPN. At 172, the NACK message may be generated and may include, as the NACK destination address, the sIP, as the NACK source address, the dIP, and as the NACK destination QPN, the sQPN. The NACK message may be sent at action 174.

Figure 11:
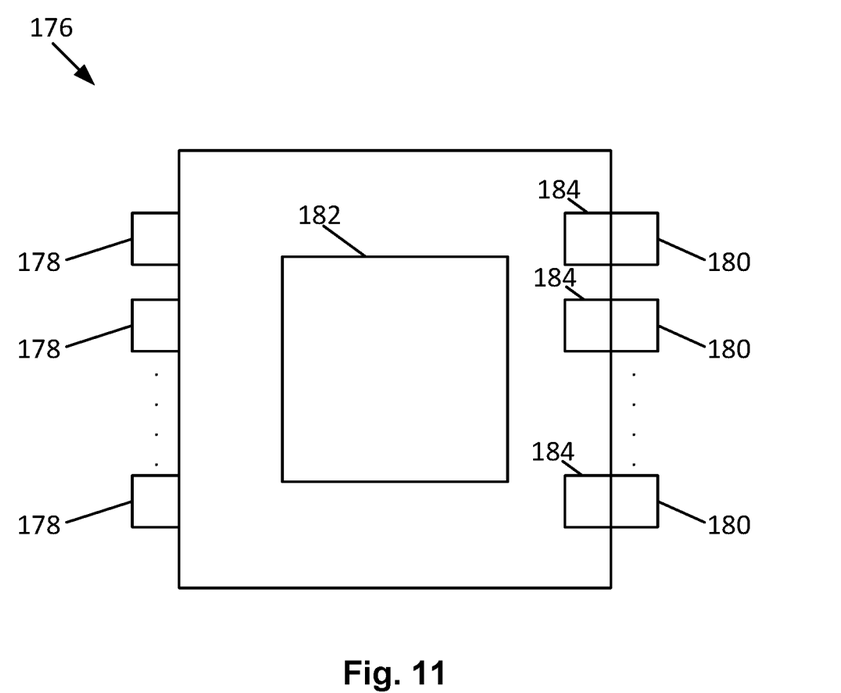
FIG. 11 shows a block diagram of a switch in accordance with an embodiment of the present invention.

FIG. 11 shows a block diagram of a non-limiting embodiment of a switch 176 in accordance with the present invention. The switch 176 may be part of a communication network and may be configured to operate under an RDMA protocol such as, for example, an RDMA over converged ethernet (RoCE) protocol or over a non-converged ethernet protocol or over a TCP/IP protocol.

The switch 176 may include an input port or more than one input port 178 and an output port or more than one output port 180. The switch 176 may also include a controller 182 that may be coupled to the input port or more than one input port 178 and may also be coupled to the output port or more than one output port 180. Each output port 180 may have a buffer 184 that may be coupled to the controller 182.

The controller 182 may be configured to manage a packet received at the switch 176 (a received packet) in accordance with a priority of the received packet and in accordance with available space at a buffer 184 of an output port 180 of the switch 176. For example, the controller 182 may be configured to decide whether the packet received at the switch 176 may be dropped, depending on the priority of the packet and on a level of occupancy of the buffer 184 (the target buffer) of the output port 180 to which the packet is to be provided (the target output port).

The controller 182 may be configured to determine a level of occupancy of the target buffer 184. For example, the controller 182 may be configured to determine if there is unoccupied space in the target buffer 184. The controller 182 may also be configured to determine if the size of the received packet is the same of is less than the size of the unoccupied buffer space of the target buffer. As another example, the controller 182 may be configured to determine a measure of occupied space of the target buffer 184 relative to the entire buffer space. As a further example, the controller 182 may be configured to determine a level of occupancy of the target buffer 184 by determining the amount of occupied buffer space and comparing that amount to a pre-determined buffer parameter. For example, the controller 182 may be configured to determine if the queue length in the target buffer 184 is greater than that threshold setting of the target buffer 184.

The controller 182 may be configured to determine the level of occupancy of the target buffer 184 by determining if the length of the queue in the target buffer 184 is greater than a threshold setting of the target buffer 184. The threshold of the target buffer 184 may be set to any value not exceeding the buffer size. As will be understood by the skilled worker, the threshold of the target buffer 184 can be fixed or can be adjusted as a function of any anticipated traffic surges or time of day.

The controller 182 may be configured to determine the level of occupancy of the target buffer 184 by determining if the buffer 184 is overflowing.

The controller 182 may be configured to determine the priority of the received packet and to determine if the priority of the received packet and the level of occupancy of the target buffer 184 meet a condition to drop the received packet. As a non-limiting example, if the level of occupancy of the target buffer 184 indicates the target buffer 184 is overflowing, then a condition to drop the received packet may be met regardless of the priority received packet. As another non-limiting example, if the level of occupancy indicates the queue length is longer than the threshold, and the priority of the received packet is low, then a condition to drop the received packet may be met.

The controller 182 may be configured to determine, in accordance with the level of occupancy of the target buffer 184, if the received packet may be provided to the target output port 180 (to the target buffer of the target output port). That is, the controller 182 may be configured to determine if there is available buffer space. For example, in some embodiments, when the size of the received packet is the same or less than the size of the unoccupied space in the target buffer, then the controller 182 may be configured to provide the received packet to the target buffer 184 of the target output port 180. As another example, in some embodiments, when the queue length is not greater than the threshold of the target buffer, then the controller 182 may be configured to provide, at action 88, the received packet to the target buffer 184 of the target output port 180.

When the controller 182 has determined there is no available space in the target buffer 184 for the received packet, the controller 182 may be configured to determine if the priority of the received packet is a high priority or a low priority. When the priority of the received packet is a high priority, then the controller 182 may apply a high priority policy to the received packet. Otherwise, when the priority of the received packet is a low priority, the controller 182 may be configured to apply a low priority policy is applied to the received packet.

When the controller 182 determines the received packet has a high priority, the controller 182 may determine if the target buffer 184 is overflowing. When the target buffer 184 is not overflowing, the controller 182 may be configured to determine again the level of occupancy of the buffer 184 and may also be configured to determine again, in accordance with the current level of occupancy, if the receive packet may be provided to the target output port 180 (to the target buffer 184 of the target output port). When the target buffer 184 is overflowing, then the controller 182 may be configured to drop the received packet.

When the controller 182 determines the received packet has a low priority, the controller 182 may be configured to drop the received packet and to provide a NACK message to the source of the received packet, indicating the received packet has been dropped.

The controller 182 may be configured to determine a length of the queue at the target output port 180. The controller 182 may also be configured to determine if the queue length is greater than the threshold setting of the output port 180. If the queue length is not greater than the threshold, then the controller 182 may be configured to provide (forward) to the target output port 180 (to the target buffer 184 of the target output port 180). Otherwise, if the queue length is greater than the threshold, then the controller 182 may be configured to determine the priority setting of the received packet. When the priority of the received packet is low, then the controller may be configured to apply a low priority policy to the received packet. Otherwise, when the priority of the received packet is high, the controller may be configured to apply a high priority policy to the received packet.

The controller 182 may be configured to determine the output port to which the received packet is to be forwarded (the target output port). The controller 182 may be configured to determine if the size of the received packet is larger than the space available at the target buffer 184 of the target output port 180. When the size of the received packet is not larger than the buffer space available at the target buffer of the target output port, then the controller 182 may be configured to forward the received packet to the target output port 180.

When the size of the received packet is larger than the buffer space available at the target buffer 184 of the target output port 180, then the controller 182 may be configured to determine a priority of the received packet. The controller 182 may be configured to determine if the priority of the received packet is a high priority. When the priority of the received packet is not a high priority, then the controller 182 may be configured to apply a low priority policy to the received packet. Otherwise, when the priority of the received packet is high, the controller 182 may be configured to apply a high priority policy to the received packet.

When the received packet includes an OpCode, the controller 182 may be configured to obtain the OpCode of the received packet. The controller 182 may be configured to determine if the obtained OpCode value meets a priority condition. When the obtained OpCode value meets the priority condition, then the controller 182 may be configured to apply a first priority drop policy to the received packet. When the obtained OpCode value does not meet the priority condition, the controller 182 may be configured to apply a second priority drop policy may be applied to the received packet.

When the controller 182 determines that a received packet is to be dropped, the controller may be configured to generate a negative acknowledgment (NACK) message and may also be configured to send the NACK message to the sender of the packet. This may allow the sender of the packet to be notified of the dropped received packet earlier than when the intended receiver of the packet determines the packet has been dropped and subsequently generates and sends a NACK message to the sender of the dropped packet.

The controller 182 may be configured to obtain, from the received packet, the source address (sIP) of the received packet. The controller 182 may also be configured to obtain, from the received packet, the destination address (dIP) of the received packet. The controller 182 may be further configured to obtain, from the received packet, the sequence number (SN) of the received packet. The controller 182 may be configured to generate a NACK message that may have a source address set to dIP, a destination address set to sIP, and the received packet SN. The controller 182 may be configured to send the NACK message to the source of the dropped packet.

In certain scenarios, the NACK message may need to include additional information to arrive at the source of the received packet. When the received packet includes the source address, the destination address and the destination queue pair number (dQPN), the controller 182 may be configured to swap the destination address and the source address and to obtain the source queue pair number (sQPN). The controller 182 may be configured to obtain the packet sIP, packet dIP and the dQPN. The controller 182 may be configured to access a connection table using the sIP, dIP and the dQPN to obtain the sQPN. The controller 182 may be configured to generate the NACK message and include the receive packet SN and, as the NACK destination address, the sIP, as the NACK source address, the dIP, and as the NACK destination QPN, the sQPN. The controller 182 may be configured to send the NACK message.

Figure 12:
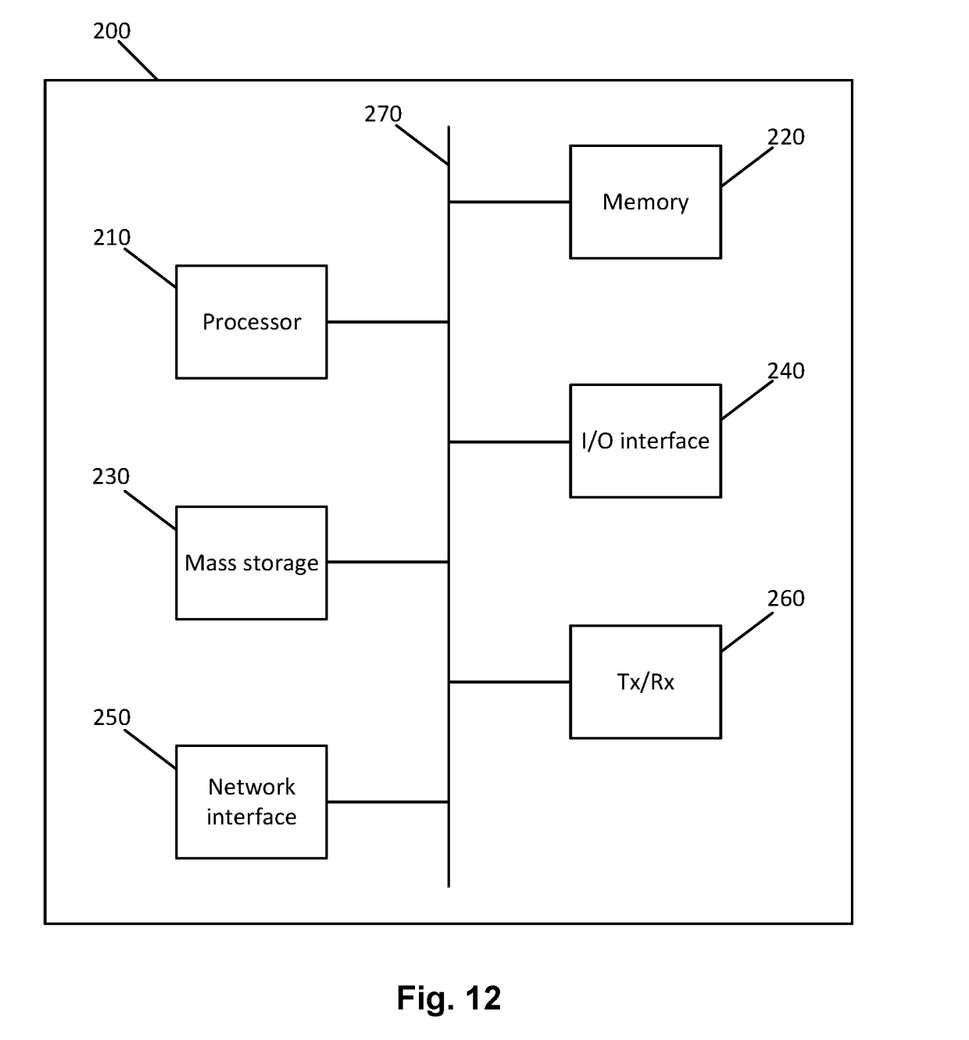
FIG. 12 shows a schematic diagram of an embodiment of computing device in accordance with the present disclosure.

FIG. 12 shows a schematic diagram of a computing device 200 that may perform any or all of actions (operations) of the methods and features explicitly or implicitly described herein, according to different embodiments of the present disclosure. For example, a computer equipped with network function may be configured as the computing device 200. One, two or more such computing devices may be coupled together in order to provide embodiments of the present disclosure. Multiple physically separate devices (e.g., in the same or separate datacenters) may be coupled together in order to provide one, two or more of such computing devices. When a device provides an infrastructure module, that device may consist primarily of an associated resource. For example, a computing module may consist primarily of computer processors, while a storage module may consist primarily of computer memory.

As shown, the device 200 may include a processor 210, such as a Central Processing Unit (CPU) or specialized processors such as a Graphics Processing Unit (GPU) or other such processor unit, memory 220, non-transitory mass storage 230, input-output interface 240, network interface 250, and a transceiver 260, all of which are communicatively coupled via bi-directional bus 270. According to certain embodiments, any or all of the depicted elements may be utilized, or only a subset of the elements. Further, the device 200 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 220 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 220 or mass storage 230 may have recorded thereon statements and instructions executable by the processor 210 for performing any of the aforementioned method operations described above. The memory 220 or the mass storage 230 may be a tangible, non-transitory computer readable medium with instructions recorded thereon to perform the actions (operations) of the methods described herein.

Through the descriptions of the preceding embodiments, the present invention may be implemented by using hardware only or by using software and a necessary universal hardware platform. Based on such understandings, the technical solution of the present invention may be embodied in the form of a software product or a computer program product, which may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
   at a network device having an ingress port and an egress port, the egress port having a buffer, the network device holding a packet received at the ingress port, from a source:
   determining a level of occupancy of the buffer;
   determining a priority of the packet;
   determining if the priority of the packet and the level of occupancy meet a condition to drop the packet;
   when the condition to drop the packet is met:
     determining an address of the source of the packet;
     determining an address of a destination of the packet;
     determining a sequence number of the packet;
     generating a message, the message including:
       an address of the source of the message, the address of the source of the message being the destination address of the packet;
       an address of the destination of the message, the address of the destination of the message being the source address of the packet, and
       the sequence number of the packet;
     dropping the packet; and
     sending to the source the message to indicate to the source that the packet has been dropped.

2. The method of claim 1, further comprising:
   at the network device:
   determining a queue pair number (QPN) of the destination of the packet;
   accessing a connection table to obtain a QPN of the source of the packet in accordance with the address of the source of the packet, the address of the destination of the packet, and the QPN of the destination of the packet, the message including, as the QPN of the destination of message, the QPN of the source of the packet.

3. The method of claim 2, further comprising:
   at the network device:
   receiving a connection request packet; and
   generating the connection table in accordance with the connection request packet.

4. The method of claim 1, wherein determining the level of occupancy of the buffer includes comparing a queue length of the buffer to a threshold setting of the buffer.

5. The method of claim 4, further comprising:
   when the queue length is greater than the threshold and when the priority of the packet satisfies a priority policy, determining if an overflow condition is met at the buffer.

6. The method of claim 5, wherein the drop condition is met when the overflow condition is met.

7. The method of claim 1, wherein:
   the packet is a received packet, and
   determining a priority of the received packet includes:
     reading an operation code (OpCode) of the received packet;
     comparing the OpCode to pre-determined OpCode values to obtain a relative priority of the received packet over other packets in a same packet flow as that of the received packet.

8. The method of claim 7, wherein OpCodes of SEND operations indicate a higher priority than OpCodes of READ operations.

9. The method of claim 7, wherein OpCodes of CONTROL operations indicate a higher priority than OpCodes of READ operations.

10. The method of claim 1, wherein determining a priority of the packet includes determining a value of a pre-determined field in a header of the packet.

11. The method of claim 1, wherein:
    the packet is a marked packet in accordance with a weighted random early detection template, a marking of the marked packet including a color, and
    determining a priority of the packet includes determining the color of the packet.

12. A network device comprising:
    an input port configured to receive a packet from a source;
    an output port having a buffer;
    a controller coupled to the input port and to the output port, the controller configured to:
    determine a level of occupancy of the buffer;
    determine a priority of the packet;
    determine if the priority of the packet and the level of occupancy meet a condition to drop the packet;
    when the condition to drop the packet is met:
      determine an address of the source of the packet;
      determine an address of a destination of the packet;
      determine a sequence number of the packet;
      generate s message, the message including:
        an address of the source of the message, the address of the source of the message being the destination address of the packet;
        an address of the destination of the message, the address of the destination of the message being the source address of the packet; and
        the sequence number of the packet;

drop the packet; and
send to the source a message indicating the packet has been dropped.

13. The network device of claim 12, wherein the controller is further configured to:
determine a queue pair number (QPN) of the destination of the packet;
access a connection table to obtain a QPN of the source of the packet in accordance with the address of the source of the packet, the address of the destination of the packet, and the QPN of the destination of the packet, the message including, as the QPN of the destination of message, the QPN of the source of the packet.

14. The network device of claim 13, wherein the controller is further configured to:
receive a connection request packet; and
generate the connection table in accordance with the connection request packet.

15. The network device of claim 12, wherein the controller is further configured to determine the level of occupancy of the buffer by comparing a queue length of the buffer to a threshold setting of the buffer.

16. The network device of claim 12, further comprising a switch, the input port and the output port being part of the switch.

17. A computer program product comprising a non-transitory computer readable medium having recorded thereon instructions to be carried out by a processor to perform, at a network device coupled to the processor, the network device having an ingress port and an egress port, the egress port having a buffer, the network device holding a packet received at the ingress port, from a source:
determining a level of occupancy of the buffer;
determining a priority of the packet;
determining if the priority of the packet and the level of occupancy meet a condition to drop the packet;
when the condition to drop the packet is met:
determining an address of the source of the packet;
determining an address of a destination of the packet;
determining a sequence number of the packet;
generating a message, the message including:
an address of the source of the message, the address of the source of the message being the destination address of the packet;
an address of the destination of the message, the address of the destination of the message being the source address of the packet; and
the sequence number of the packet;
dropping the packet; and
sending to the source a message indicating the packet has been dropped.

* * * * *